B. G. WARD.
ART OF MAKING AND MOUNTING ARTIFICIAL BIRDS.
APPLICATION FILED DEC. 20, 1920.
1,412,074.
Patented Apr. 11, 1922.
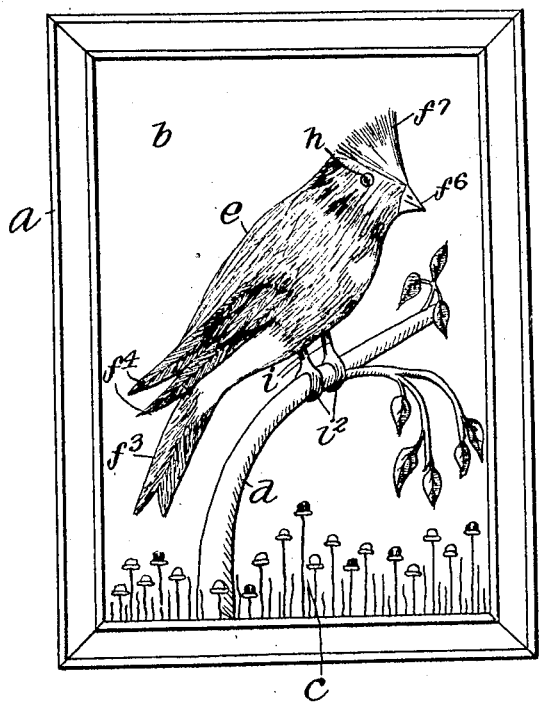
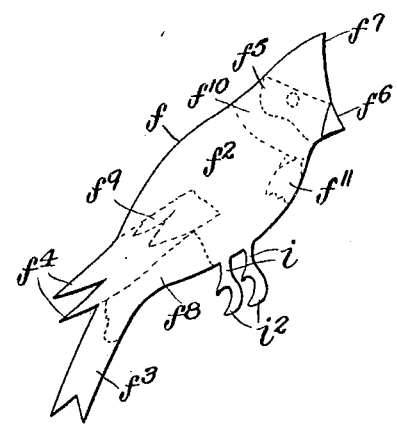
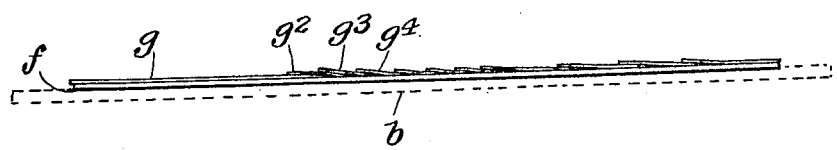
Inventor
Bertrand G. Ward,
By his Attorney

UNITED STATES PATENT OFFICE.

BERTRAND G. WARD, OF JERSEY CITY, NEW JERSEY.

ART OF MAKING AND MOUNTING ARTIFICIAL BIRDS.

1,412,074.  Specification of Letters Patent.  Patented Apr. 11, 1922.

Application filed December 20, 1920. Serial No. 431,843.

*To all whom it may concern:*

Be it known that I, BERTRAND G. WARD, a citizen of the United States, and residing at Jersey City, in the county of Hudson and State of New Jersey, have invented certain new and useful Improvements in the Art of Making and Mounting Artificial Birds, of which the following is a specification, such as will enable those skilled in the art to which it appertains to make and use the same.

This invention relates to the production of artificial birds for use in decorations and for other purposes, and the invention consists in the improvements hereinafter described in the art of making artificial birds and also in the art of mounting said birds for decorative or other purposes.

The invention is fully disclosed in the following specification, of which the accompanying drawing forms a part, in which the separate parts of my improvement are designated by suitable reference characters in each of the views, and in which:—

Fig. 1 is a view of an ordinary picture frame and showing a picture mounted therein and involving my invention;

Fig. 2 a side view of a cardboard or other fibrous form which I employ in the production or reproduction of the representation of a bird; and, Fig. 3 a side edge view of the representation of a bird so produced and also of a backing card on which said representation of a bird is mounted as shown in Fig. 1.

In the drawing forming part of this specification I have shown in Fig. 1 an ordinary picture frame $a$ in which is placed a card $b$ at the bottom of which is represented growing flowers $c$ from the midst of which springs a bush or small tree $d$ on which is mounted, or in connection with which is mounted or represented one of my artificial birds $e$.

In the practice of my invention and in forming the artificial bird $e$, I first provide a form $f$ shown in Fig. 2, which is cut from any cardboard or other suitable fibrous material and a side edge view of which is given in Fig. 3, and this form, as shown, constitutes a body portion $f^2$, a tail portion $f^3$, parts $f^4$ representing the tips of the wings, a head portion $f^5$, a beak $f^6$ and a top-knot portion $f^7$, and in order to aid in properly placing the feathers on the form so as to give the desired feather color, I also preferably divide the form by means of dotted lines into parts $f^8$, $f^9$, $f^{10}$ and $f^{11}$.

It will be understood, or course, that in selecting the feathers, the tip portion only of which is preferably employed, care must be taken in order to select feathers of such color as will properly produce a representation of the bird which the artist has in mind, and these feathers may be of natural colors, or they may be dyed in order to produce the required results.

The feathers are secured to the form by means of any suitable paste or adhesive material, and in pasting the feathers on the form as indicated in Fig. 3, the tail feathers $g$ are first secured at their inner ends to the form, after which successive layers are secured to the form as shown at $g^2$, $g^3$, $g^4$, etc., until the entire form is covered with feathers, as indicated in Fig. 3, each successive layer being secured to the form forwardly of the preceding layer, and at the front ends of said layers so that each successive layer overlaps the preceding layer, as shown in said figure, and at this time, or previous to the attachment of the feathers to the form, the bird or the representation thereof, is provided with an eye $h$.

As hereinbefore stated, in the above process of securing the feathers to the form, care must be taken to select feathers of such color as will properly represent the bird, a copy or representation of which is to be produced.

The form $f$ is also provided with legs $i$ and claws $i^2$ which together with the beak $f^6$ can be colored in any desired manner as may also the eye $h$, and the legs $i$ may also be provided with feathers, if desired, and, in practice, the bird $e$ is mounted on the card $b$ or secured thereto by a suitable paste or glue, and this operation is performed in such manner that the claws $i^2$ of the bird appear to be grasping the small bush or tree $d$, or a part thereof, as clearly represented in Fig. 1.

By proceeding in the manner hereinbefore described, I am able to produce a most natural and life-like representation of a bird of any variety, and mount the same in a most natural way, it being understood that the card $b$ may be provided with a picture or pictures of any desired flowers or vegetable growths and that any species of a bird may be produced and mounted in such manner as to represent its natural environment, and it must also be understood that the use of a frame is not necessary in the employment of birds mounted according to my invention for decorative purposes, and if the frame is used, as herein shown and described, a glass or other transparent plate or protector may be placed over the pictorial representation therein in the usual manner, if desired.

Instead of proceeding, as hereinbefore described, in forming the representation of the bird, I may first outline the form of the bird on a fibrous board or card, of any kind and then proceed as hereinbefore described to apply the requisite feathers to said form, after which the form with the feathers applied thereto is cut from the cardboard or other suitable material, and it is evident that the result produced in following this method of procedure will be the same as that hereinbefore described.

It must also be understood that while I have shown and described my invention as an improvement in the art of making artificial birds and mounting the same for various purposes, my invention is not limited to the making of artificial birds alone, nor to the method of mounting the same but it may be employed in the making or producing of other feathered objects or animals of various species or classes, and changes in and modifications of the method of procedure herein set out, and details of construction herein shown and described may be made, within the scope of the appended claims, without departing from the spirit of my invention or sacrificing its advantages.

Having fully described my invention, what I claim as new and desire to secure by Letters Patent, is:—

1. The herein described method of producing artificial birds which consists of providing a cardboard backing or mounting element of the form of the bird to be produced, marking said element to divide the same into separate parts or sections to facilitate the placement of the feathers of different colors thereon, then securing selected feathers of different colors to the separate parts or sections of said element, and otherwise marking said element thus formed to produce a complete representation of the bird selected.

2. The herein described method of producing artificial birds which consists in providing a backing or mounting element of the form of the bird to be produced, marking said element to divide the same into separate parts or sections to facilitate the placement of feathers of predetermined form and color thereon, and then securing to the separate parts or sections of said element feathers of predetermined form and color to produce a representation of the bird selected.

3. The herein described method of producing and mounting artificial birds for decorative purposes which consists in providing a flat cardboard element fashioned to the form of the bird to be produced, marking said element and dividing the same into separate parts or sections to faciltiate the placement of feathers of different colors thereon, securing said feathers to the separate parts or sections of said element, mounting said element on a cardboard support or holder and then mounting said cardboard or holder in a frame.

In testimony that I claim the foregoing as my invention I have signed my name in presence of the subscribing witnesses this 18th day of December, 1920.

BERTRAND G. WARD.

Witnesses:
C. E. MULREANY,
H. E. THOMPSON.